(12) United States Patent
Curtis

(10) Patent No.: US 11,350,553 B2
(45) Date of Patent: Jun. 7, 2022

(54) GROUSER-CAGE ATTACHMENT FOR EQUIPMENT

(71) Applicant: Marlon Lane Curtis, Clinton, PA (US)

(72) Inventor: Marlon Lane Curtis, Clinton, PA (US)

( * ) Notice: Subject to any disclaimer, the term of this patent is extended or adjusted under 35 U.S.C. 154(b) by 0 days.

(21) Appl. No.: 17/408,064

(22) Filed: Aug. 20, 2021

(65) Prior Publication Data
US 2022/0061201 A1 Mar. 3, 2022

Related U.S. Application Data

(63) Continuation-in-part of application No. 29/753,782, filed on Oct. 1, 2020.

(60) Provisional application No. 63/070,265, filed on Aug. 26, 2020.

(51) Int. Cl.
*A01B 29/04* (2006.01)
*A01B 29/06* (2006.01)

(52) U.S. Cl.
CPC ............ *A01B 29/048* (2013.01); *A01B 29/06* (2013.01)

(58) Field of Classification Search
CPC ...................................... A01B 29/06
See application file for complete search history.

(56) References Cited

U.S. PATENT DOCUMENTS

| | | | |
|---|---|---|---|
| 24,597 A * | 6/1859 | Young ............... | A01B 29/048 172/68 |
| 52,496 A * | 2/1866 | Myers ............... | A01B 29/045 172/547 |
| 107,074 A * | 9/1870 | McConaughy ...... | A01B 33/021 172/554 |
| 186,684 A * | 1/1877 | Martin ............... | A01B 29/045 172/547 |
| 231,757 A * | 8/1880 | Caldwell et al. ...... | A01C 5/06 111/69 |

(Continued)

FOREIGN PATENT DOCUMENTS

CN 103332449 A 10/2013

OTHER PUBLICATIONS

Grains Research & Development Coporation, How do you roll after soil amelioration, https://grdc.com.au/news-and-media/news-and-media-releases/west/2020/march/how-do-you-roll-after-soil-amelioration, Mar. 26, 2020.

(Continued)

*Primary Examiner* — Jessica H Lutz

(57) ABSTRACT

A grouser-cage attachment for equipment is an apparatus that imprints troughs into the soil, specifically troughs oriented perpendicular to a slope to hinder rainfall from running straight down the slope. The apparatus includes a main frame, a roller, and a grouser cage. The main frame connects the roller with a piece of equipment or large machinery such as a skid steer. The roller presses the grouser cage into the soil. The grouser cage further includes a cylindrical frame, a plurality of holes, and a plurality of cleats. The cylindrical frame supports and positions the plurality of cleats around the roller. The cylindrical frame freely rotates around and with the roller. The plurality of holes and the plurality of cleats imprints troughs into the soil. The plurality of holes also provides a smooth and continuous rotation for the grouser cage. The roller presses the plurality of cleats into the soil.

15 Claims, 4 Drawing Sheets

(56) References Cited

U.S. PATENT DOCUMENTS

| | | | | |
|---|---|---|---|---|
| 337,480 | A * | 3/1886 | Clay | A01B 29/041 172/545 |
| 500,253 | A * | 6/1893 | Johnson et al. | A01B 29/045 172/547 |
| 527,993 | A * | 10/1894 | Jones | A01B 29/048 172/68 |
| 1,069,264 | A * | 8/1913 | Keller | A01B 29/041 172/154 |
| 1,250,570 | A * | 12/1917 | Dunham | A01B 29/041 172/154 |
| 1,483,789 | A * | 2/1924 | Earhart | A01B 35/16 172/554 |
| 1,637,424 | A * | 8/1927 | Morrow | A01B 29/041 172/537 |
| 1,662,052 | A * | 3/1928 | Bullock | A01B 27/00 172/543 |
| 1,855,091 | A * | 4/1932 | Brown | A01B 29/04 172/529 |
| 1,858,948 | A * | 5/1932 | Bird | A01B 29/045 172/554 |
| 2,040,710 | A * | 5/1936 | Riehl | A01B 29/041 172/154 |
| 2,209,478 | A * | 7/1940 | Selhorst | A01B 49/027 172/142 |
| 2,678,593 | A * | 5/1954 | Hugman | E01C 19/266 404/124 |
| 2,687,683 | A * | 8/1954 | Chattin | A01B 35/16 172/552 |
| 2,754,734 | A * | 7/1956 | Gardner | E02D 3/026 404/124 |
| 2,776,532 | A * | 1/1957 | Buchholz | A01B 29/045 172/554 |
| 2,811,912 | A * | 11/1957 | Howard | A01B 29/048 172/550 |
| 2,966,948 | A * | 1/1961 | Ulsh | A01B 29/06 172/72 |
| 3,022,755 | A * | 2/1962 | Roepke | A01C 7/04 111/171 |
| 3,220,369 | A * | 11/1965 | Gandrud | A01B 29/04 111/130 |
| 3,392,791 | A * | 7/1968 | Orthman | A01B 27/00 172/105 |
| 3,714,913 | A * | 2/1973 | Gandrud | A01C 15/00 111/80 |
| 3,832,079 | A * | 8/1974 | Moorhead | B44B 5/0009 404/72 |
| 3,910,712 | A * | 10/1975 | Guerin | A01B 29/00 404/124 |
| 4,240,510 | A * | 12/1980 | Morin | A01B 29/045 172/39 |
| 4,360,065 | A * | 11/1982 | Jenison | A01B 33/021 172/119 |
| 4,492,172 | A * | 1/1985 | Gramckow | A01C 5/06 111/130 |
| 5,353,724 | A * | 10/1994 | Wheeley, Jr. | A01B 29/06 111/118 |
| 5,421,670 | A * | 6/1995 | Meirick | E01C 19/43 404/124 |
| 6,003,453 | A * | 12/1999 | Epp | A01B 49/06 111/157 |
| 6,068,061 | A * | 5/2000 | Smith | A01B 13/08 172/139 |
| 6,945,182 | B1 * | 9/2005 | Haukaas | A01B 29/04 111/136 |
| 6,962,039 | B2 * | 11/2005 | Greenhoe | A01B 29/041 56/16.7 |
| 6,968,907 | B1 * | 11/2005 | Raper | A01B 29/045 172/518 |
| 7,562,517 | B1 * | 7/2009 | Kornecki | A01B 13/02 172/554 |
| 7,730,961 | B2 * | 6/2010 | Ward | A01B 29/041 172/537 |
| 7,814,613 | B1 * | 10/2010 | Whittaker | A47L 11/22 15/366 |
| 8,491,451 | B2 * | 7/2013 | Phely | A01B 29/043 492/30 |
| 8,714,278 | B2 * | 5/2014 | Wright | A01B 29/043 172/519 |
| 8,898,859 | B2 * | 12/2014 | Song | A47L 9/0483 15/382 |
| 9,192,098 | B2 * | 11/2015 | Hinton | A01D 34/8355 |
| D747,052 | S * | 1/2016 | Therrien | D32/31 |
| 9,255,365 | B1 * | 2/2016 | Schmidt | E01C 19/286 |
| 9,326,439 | B2 * | 5/2016 | Westlind | A01B 33/142 |
| 9,516,803 | B1 * | 12/2016 | Rosenboom | A01C 5/068 |
| 10,412,874 | B2 * | 9/2019 | Post | A01B 29/041 |
| D861,739 | S * | 10/2019 | Fox | D15/28 |
| 10,863,662 | B2 * | 12/2020 | Piou | A01B 29/043 |
| D914,307 | S * | 3/2021 | Weis | D32/31 |
| 11,006,562 | B2 * | 5/2021 | Meier | E01C 23/127 |
| 11,111,638 | B2 * | 9/2021 | Marsolek | E02D 3/0265 |
| 2002/0000323 | A1 * | 1/2002 | McDonald | A01B 29/041 172/537 |
| 2003/0167745 | A1 * | 9/2003 | Greenhoe | A01B 45/00 56/16.7 |
| 2007/0240888 | A1 * | 10/2007 | Wright | A01B 29/041 172/21 |
| 2010/0135724 | A1 * | 6/2010 | Roth | E02D 3/046 404/124 |
| 2013/0062084 | A1 * | 3/2013 | Casper | A01B 49/027 172/540 |
| 2017/0049037 | A1 * | 2/2017 | Hilvers | A01B 29/048 |

OTHER PUBLICATIONS

Amazone, U-profile roller UW, https://amazone.co.uk/en-GB/products-digital-solutions/agricultural-technology/cultivation/u-profile-roller-uw-98342.

Oliveragro, Granular Fumigant Localizer mod. Mirrow, https://www.oliveragro.com/product/horticolture/granular-fumigant-localizer-mod-mirrow/.

* cited by examiner

GROUSER-CAGE ATTACHMENT FOR EQUIPMENT

The current application claims a priority to the U.S. provisional patent application Ser. No. 63/070,265 filed on Aug. 26, 2020.

The current application is a continuation-in-part (CIP) application of the U.S. design application Ser. No. 29/753,782 filed on Oct. 1, 2020.

FIELD OF THE INVENTION

The present invention generally relates to construction. More specifically, the present invention is a grouser-cage attachment for equipment.

BACKGROUND OF THE INVENTION

Many existing agricultural equipment and construction equipment and machinery exist in which assist the production and formation of a farm or of the likes. More specifically, the need for soil compaction and prevention of erosion exists in a plurality of industries such as the farming industry, the oil and gas industry, the landscaping industry, the commercial and residential construction industry, the highway construction industry, or of the likes. Soil compacting and prevention of erosion creates an immense strain on the cost of labor, equipment and machinery, and fuel when it comes to saving money on the process of soil compaction and prevention of erosion. Shaping slopes of disturbed soil, compacting, erosion prevention and preparing for seeding is a task that many industries must regularly deal with. For seeding, there is a need for trough imprints, to be placed in the soil perpendicular to the slope. The process is requested, even to the point of warranty by many seed manufacturers and utilized to prevent the seed from washing down the slope during a rainfall and pooling up at the bottom of the slope.

An objective of the present invention is to provide a machinery utilized for the compaction and erosion controls of soil or of the likes. The present invention is a machinery that creates imprints of trough on soil and causes run-off water from rainfall to run perpendicularly to slopes rather than having rainfall run straight down the slope which can quickly create extreme erosion or unwanted pool of water. The present invention also creates imprints of troughs in which acts as a bason to capture seed and sediment therefore creating a seed bed for the seed and preventing the seed from washing down the slope. Furthermore, the present invention creates imprints of troughs that allow the seed to become captured in the trough and germinate within the imprints of troughs. There are also several applications where straw or like material is spread over the soil where in the straw needs to be pushed down into the dirt to help with erosion control. This device will work very well in this application, known as "crimping".

As presented, this would comprise of one unit. If needed, there could be several individual units attached together as a multiple unit used in the same fashion as described as a single unit.

DETAIL DESCRIPTIONS OF THE INVENTION

Figure 1:
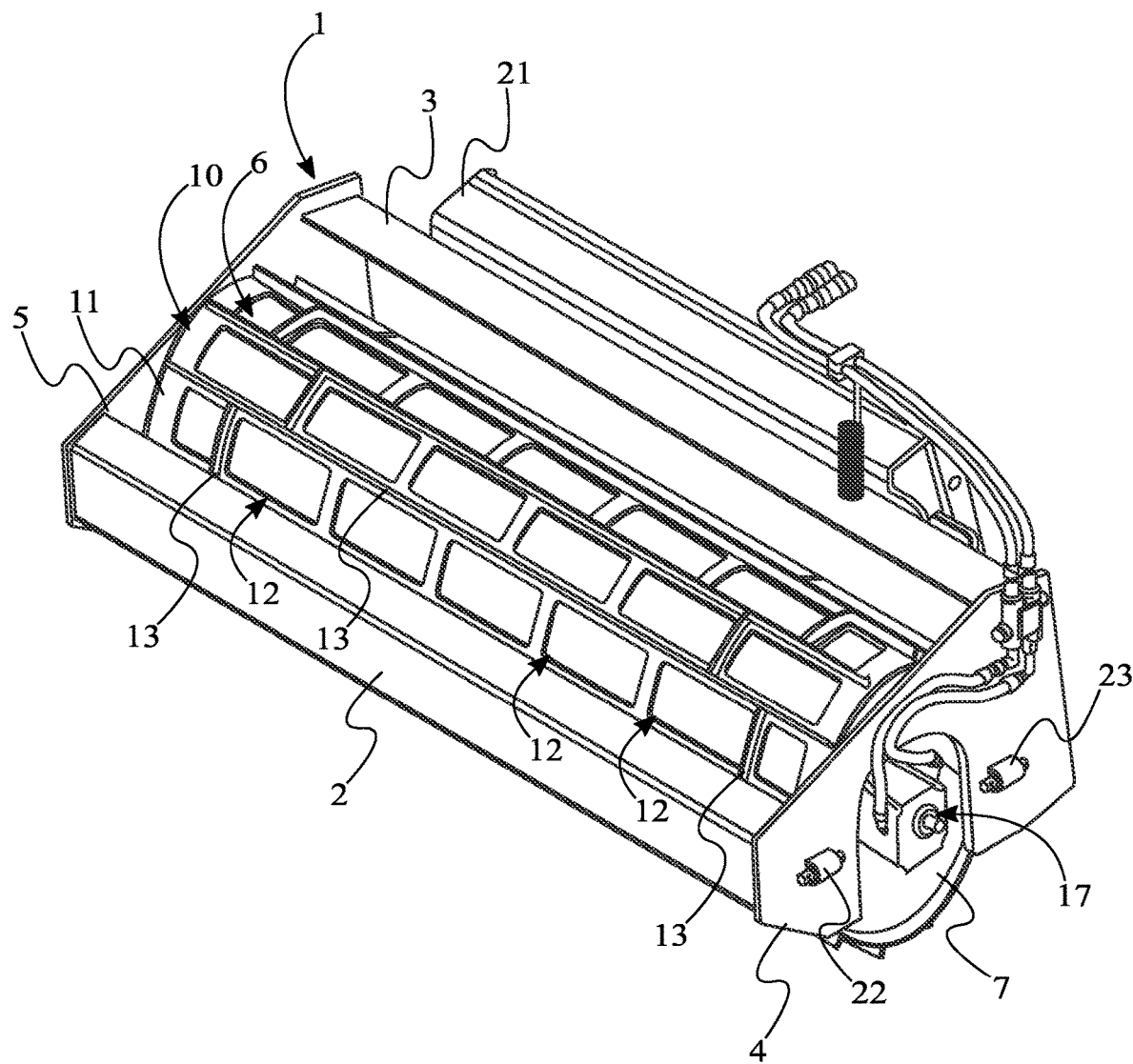
FIG. 1 is a perspective view of the present invention.

All illustrations of the drawings are for the purpose of describing selected versions of the present invention and are not intended to limit the scope of the present invention.

The present invention is a grouser-cage attachment for equipment. The present invention compacts soil in order to prevent the erosion of soil and in order to condition the soil. Moreover, the present invention also creates imprints of troughs on soil therefore causing runoff water from rainfall to run straight perpendicularly to slopes. The positioning of the troughs inhibits the rainfall from running straight down the slope which can quickly lead to extreme erosion and unwanted pooling of water. The trough imprints also act as a basin to capture the seed and sediment during rainfall, thereby creating a seed bed and preventing seed from washing down a slope. In order to effectively imprint into the soil, the present invention may comprise a main frame 1, a roller 6, and a grouser cage 10, seen in FIG. 1 and FIG. 2. The main frame 1 positions and upholds the roller 6 with external machinery. The main frame 1 surrounds the roller 6, as well as the grouser cage 10. More specifically, the main frame 1 connects the present invention with equipment for construction or road construction such as a skid steer, a track hoe, a tractor, a dozer, a variety of rubber-tired equipment, and so on. The main frame 1 may comprise a bumper member 2, a cover member 3, a first lateral member 4, and a second lateral member 5. The bumper member 2 shields the grouser cage 10, and consequently the roller 6 from any damaging objects and protects individuals from getting injured by the grouser cage 10 and the roller 6. Moreover, the bumper member 2 and the cover member 3 connect the first lateral member 4 with the second lateral member 5. The cover member 3 provides a mountable surface for equipment and shields any debris, mud, or dirt that is picked up off the soil by the grouser cage 10. The first lateral member 4 and the second lateral member 5 position and connect the bumper member 2 and the cover member 3 with each other. The roller 6 rotates and presses the grouser cage 10 into the soil. The roller 6 is preferably made of solid steel and is coated with a non-stick layer in order to prevent any soil from sticking across the roller 6. The grouser cage 10 creates troughs into the soil. Similar with the roller 6, the grouser cage 10 is also coated with a non-stick layer to prevent the soil from sticking across the grouser cage 10. The grouser cage 10 may comprise a cylindrical frame 11, a plurality of holes 12, and a plurality of cleats 13. The cylindrical frame 11 surrounds the roller 6 and positions the cleats around the roller 6. The cylindrical frame 11 has the structural integrity necessary to withstand the force of the roller 6 pressing the plurality of cleats 13 into the soil. The plurality of holes 12 offset the plurality of cleats 13 and allows the grouser cage 10 to continuously and smoothly traverse across the ground. The plurality of cleats 13 directly traverses into the ground, directly imprinting the troughs into the soil. The plurality of cleats 13 also create traction for the present invention while rolling across the soil. The resistance between each cleat of the plurality of cleats 13 generate energy needed to roll the grouser cage 10 between the soil and the roller 6. Moreover, in the preferred embodiment of the present invention, a diameter of the grouser cage 10 is three inches larger than a diameter of the roller 6. The difference in diameter allows the present invention, specifically the grouser cage 10 and the roller 6 to be self-cleaning.

The overall configuration of the aforementioned components continuously and thoroughly creates imprints into the soil. In order for the roller 6, and consequently the grouser cage 10 to be maneuvered with equipment, the first lateral member 4 and the second lateral member 5 are positioned parallel and offset from each other. Moreover, the bumper member 2 and the cover member 3 are positioned parallel and offset from each other, seen in FIG. 1. In the preferred embodiment of the present invention, the first lateral member 4 and the second lateral member 5 are positioned perpendicular with the bumper member 2 and the cover member 3, thereby creating a rectangular shape for the main frame 1, maximizing contact between the grouser cage 10 and the soil as well as the structural integrity of the main frame 1. More specifically, the longer width of the main frame 1 allows for higher coverage on larger surface areas of soil, thereby increasing the efficiency of the present invention. The main frame 1 is structurally sounds as the first lateral member 4 and the second lateral member 5 are fixed in between the bumper member 2 and the cover member 3. The roller 6 smoothly rotates as the equipment drives forwards as the roller 6 is positioned in between the bumper member 2 and the cover member 3. The roller 6 remains connected with the main frame 1 as a first circular base 7 of the roller 6 is rotatably mounted with the first lateral member 4, and a second circular base 8 of the roller 6 is rotatably mounted with the second lateral member 5. The first circular base 7 and the second circular base 8 are planar surfaces that connect with the first lateral member 4 and the second lateral member 5, respectively. The grouser cage 10 freely rotates with the roller 6 as the cylindrical frame 11 is laterally positioned around the roller 6. Therefore, the grouser cage 10 is pressed into the soil with solely the weight and the motion of the roller 6. The grouser cage 10 smoothly traverses across the soil as the plurality of holes 12 and the plurality of cleats 13 are distributed across the cylindrical frame 11. In order for the cleats to press into the soil, the plurality of cleats 13 is externally fixed with the cylindrical frame 11. The plurality of holes 12 is positioned offset amongst each other, and the plurality of cleats 13 is positioned offset amongst each other, effectively creating troughs in the soil. In order to orient the troughs perpendicular with the slope, each of the plurality of cleats 13 is positioned parallel with a rotation axis 9 of the roller 6.

Figure 3:
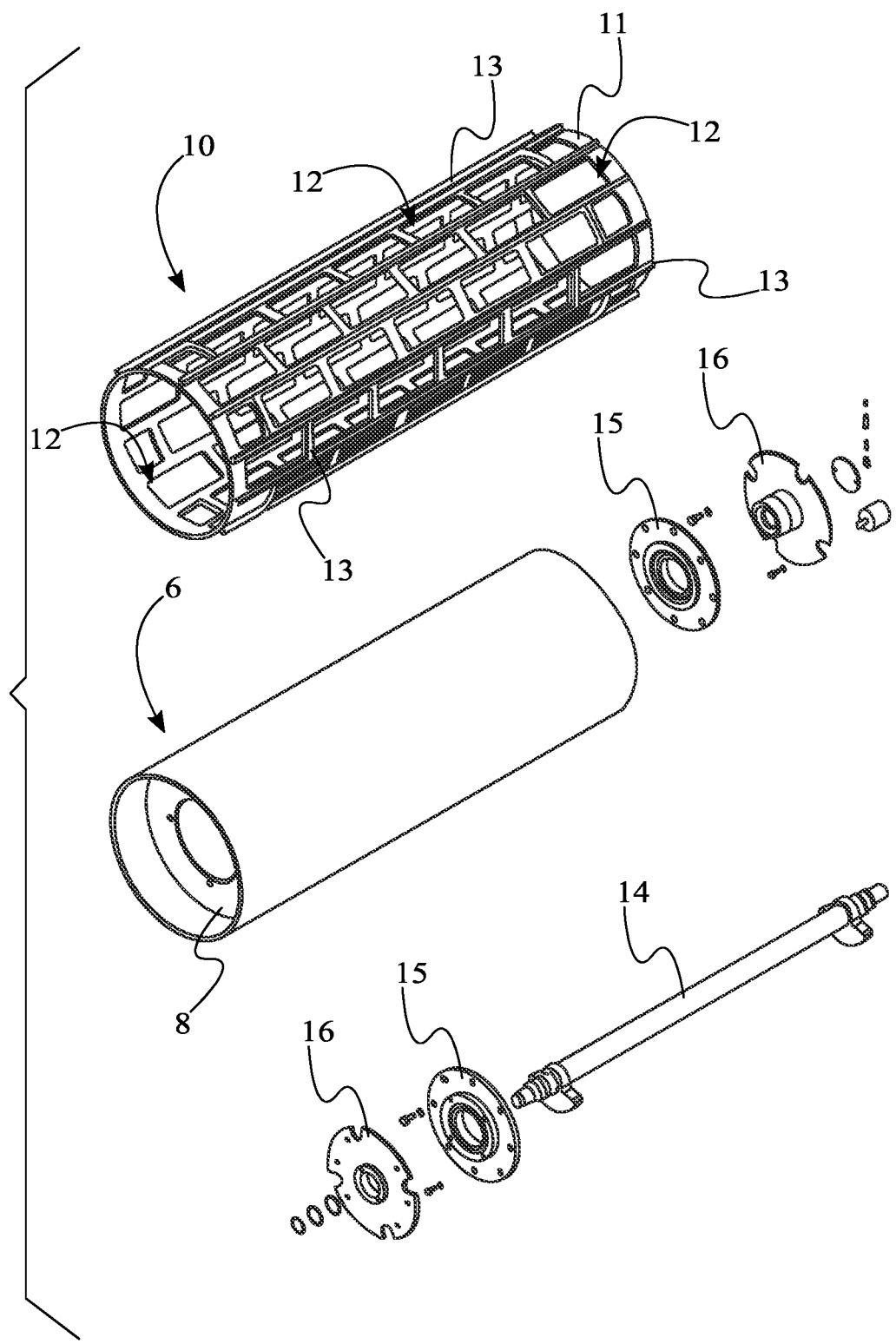
FIG. 3 is an exploded view of a grouser cage, a roller, and a main shaft of the present invention.

In order for the roller 6 to be maneuvered with a piece of equipment, the present invention may further comprise a main shaft 14, a first bearing 15, and a second bearing 16, seen in FIG. 3. The main shaft 14 connects the first bearing 15 with the second bearing 16. The first bearing 15 and the second bearing 16 secures the main shaft 14 with the roller 6. In order for an outer surface of the roller 6 to remain smooth and constantly press onto the soil, the main shaft 14 is coaxially positioned with the roller 6 and is rotatably mounted through the roller 6. The roller 6 rotates while connected to the main frame 1 as the main shaft 14 is rotatably mounted to the first lateral member 4 by the first bearing 15, the main shaft 14 is rotatably mounted to the second lateral member 5 by the second bearing 16.

Figure 4:
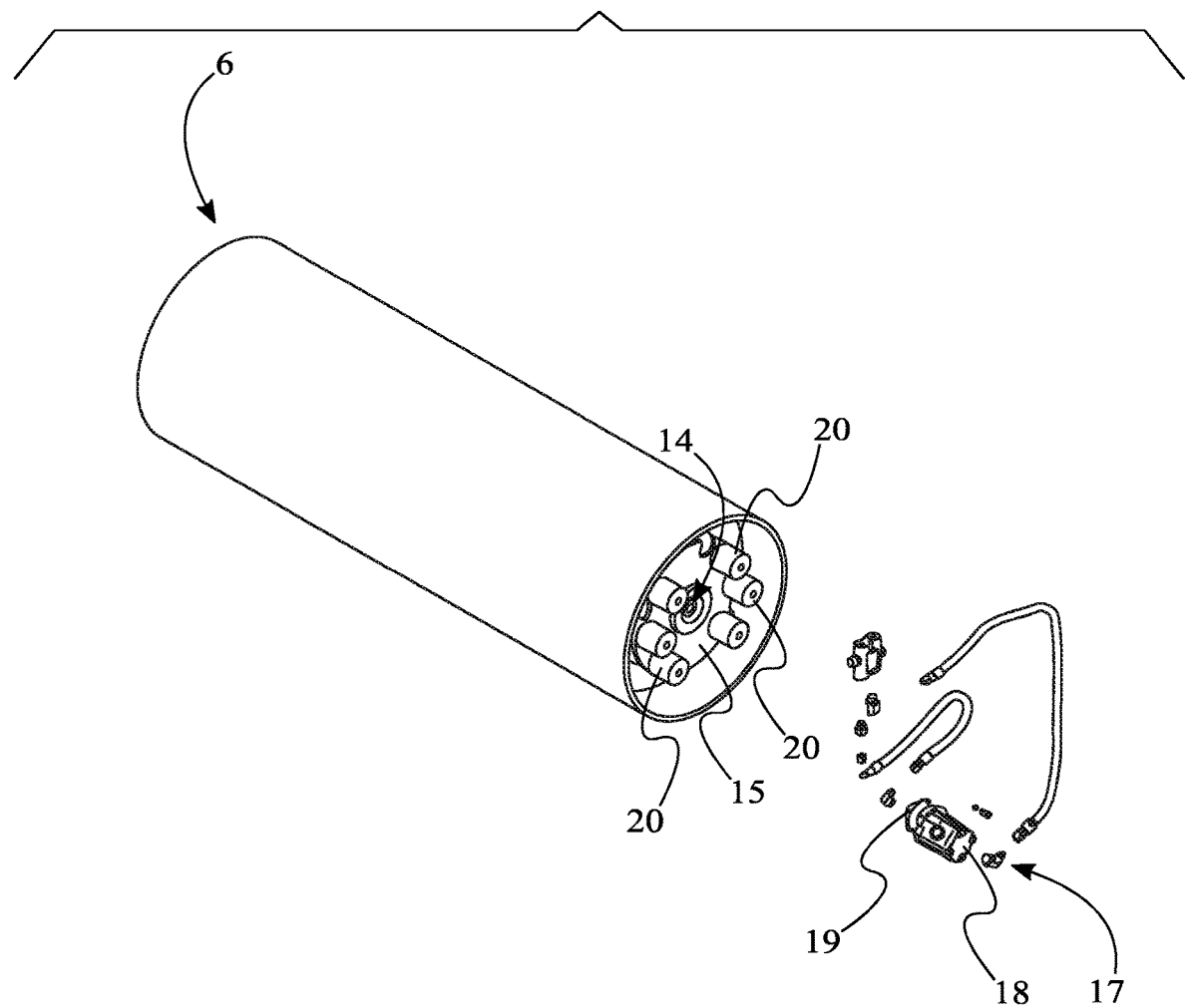
FIG. 4 is an exploded view of a hydraulic motor with the roller and the main shaft of the present invention.

The preferred embodiment of the present invention further comprises a hydraulic motor 17 and a plurality of weights 20, seen in FIG. 4. The hydraulic motor 17 spins the shaft and creates a high speed vibration, which in turn aids the compaction of the soil. The plurality of weights 20 reinforces the imprint of the troughs by the plurality of cleats 13 into the soil by increasing the force of the roller 6 onto the soil during rotation. In order for the hydraulic motor 17 to effectively control the rotation of the main shaft 14, the hydraulic motor 17 comprises a stator 18 and a rotor 19. The stator 18 is positions and secures the rotor 19 with the main frame 1. The rotor 19 rotates the main shaft 14. The roller 6 freely rotates by remaining engaged by the hydraulic motor 17 as the stator 18 is mounted onto the first lateral member 4, opposite to the roller 6. The rotor 19 is torsionally connected to the main shaft 14, thereby controlling the rotation of the shaft. The rotational force of the rotor 19 is amplified as the plurality of weights 20 is positioned in between the first lateral member 4 and the first circular base 7 and is laterally connected about the main shaft 14.

Figure 2:
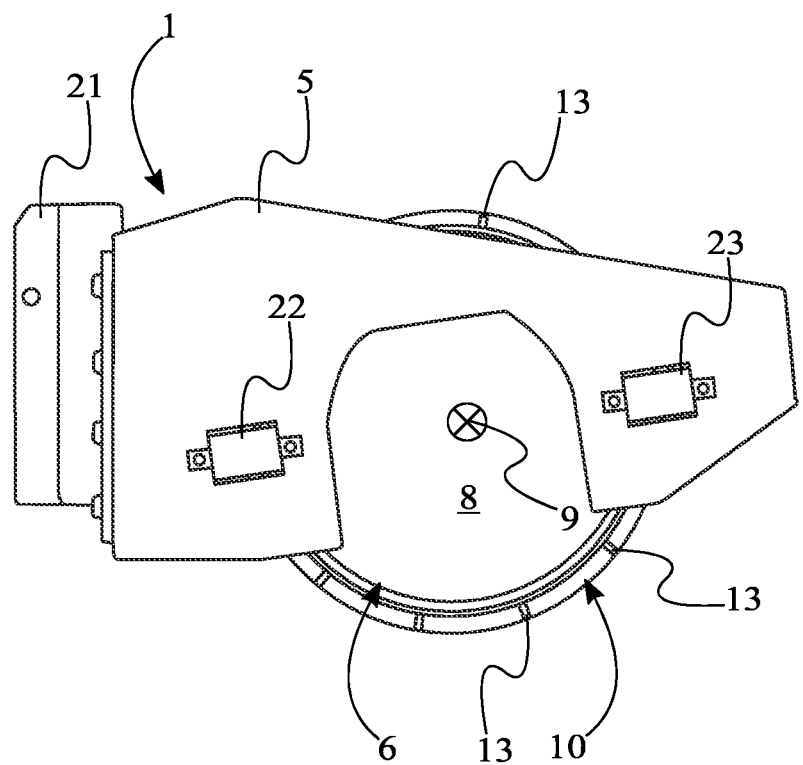
FIG. 2 is a left side view of the present invention.

In order to ensure a smooth and continuous path for the present invention, the first lateral member 4 tapers from the cover member 3 to the bumper member 2, seen in FIG. 1 and FIG. 2, Likewise, the second lateral member 5 tapers from the cover member 3 to the bumper member 2, seen in FIG. 2. The tapered construction prevents the present invention from coming to a halt if the present invention runs into a mound of dirt, or the like. Moreover, a height of the cover member 3 is greater than a height of the bumper member 2. The bumper member 2 therefore serves as a connection for the first lateral member 4 and the second lateral member 5 while preserving the strength of the main frame 1.

The main frame 1 may be connected with a variety of equipment as the present invention may further comprise a coupler plate 21, seen in FIG. 1 and FIG. 2. The coupler plate 21 provides the necessary adapter or adapters to securely connect the main frame 1 with specific equipment. The coupler plate 21 is positioned adjacent with the cover member 3, opposite the roller 6, so that the connection between the equipment and the main frame 1 does not inhibit the rotation of the roller 6, and consequently the grouser cage 10. Moreover, the coupler plate 21 is fixed along the cover member 3, providing a secure connection of the main frame 1 with the equipment.

In order to protect the main frame 1 from the free rotation of the grouser cage 10 with the roller 6, the present invention may further comprise a pair of first rollers 22, seen in FIG. 1. The pair of first rollers 22 specifically bounds the grouser cage 10 across the first lateral member 4 so that the grouser cage 10 does not damage the first lateral member 4 by banging against the first lateral member 4 while rotating. Moreover, the pair of first rollers 22 keeps the grouser cage 10 aligned with the roller 6 and prevents any misalignment between the grouser cage 10 and the roller 6. The pair of first rollers 22 is rotatably mounted into the first lateral member 4 and is positioned opposite with each other about the grouser cage 10, thereby preserving the continuous and smooth rotation of the grouser cage 10 with the roller 6. Moreover, the grouser cage 10 is pressed against the pair of first rollers 22, offsetting the grouser cage 10 with the first lateral member 4.

Similarly, the present invention may further comprise a pair of second rollers 23, seen in FIG. 2. The pair of second roller 6 specifically bounds the grouser cage 10 across the second lateral member 5 so that the grouser cage 10 does not damage the second lateral member 5 by banging against the second lateral member 5 while rotating. Moreover, the pair of second rollers 23, in conjunction with the pair of first rollers 22, keeps the grouser cage 10 aligned with the roller 6 and prevents any misalignment between the grouser cage 10 and the roller 6. The pair of second rollers 23 is rotatably mounted into the second lateral member 5 and is positioned opposite with each other about the grouser cage 10, thereby preserving the continuous and smooth rotation of the grouser cage 10 with the roller 6. Moreover, the grouser cage 10 is pressed against the pair of second rollers 23, offsetting the grouser cage 10 with the second lateral member 5.

Although the invention has been explained in relation to its preferred embodiment, it is to be understood that many other possible modifications and variations can be made without departing from the spirit and scope of the invention as hereinafter claimed.

What is claimed is:

1. A grouser-cage attachment for equipment comprising:
a main frame;
a roller;
a grouser cage;
the main frame comprising a bumper member, a cover member, a first lateral member, and a second lateral member;
the grouser cage comprising a cylindrical frame, a plurality of holes, and a plurality of cleats;
the first lateral member and the second lateral member being positioned parallel and offset from each other;
the bumper member and the cover member being positioned parallel and offset from each other;
the first lateral member and the second lateral member being fixed in between the bumper member and the cover member;
the roller being positioned in between the bumper member and the cover member;
a first circular base of the roller being rotatably mounted with the first lateral member;
a second circular base of the roller being rotatably mounted with the second lateral member;
the cylindrical frame being laterally positioned around the roller;
the plurality of holes and the plurality of cleats being distributed across the cylindrical frame;
the plurality of cleats being externally fixed with the cylindrical frame;
the plurality of holes being positioned offset amongst each other;
the plurality of cleats being positioned offset amongst each other;
each of the plurality of cleats being positioned parallel with a rotation axis of the roller;
a main shaft;
a first bearing;
a second bearing;
the main shaft being coaxially positioned with the roller;
the main shaft being rotatably mounted through the roller;
the main shaft being rotatably mounted to the first lateral member by the first bearing; and,
the main shaft being rotatably mounted to the second lateral member by the second bearing.

2. The grouser-cage attachment for equipment as claimed in claim 1 comprising:
the first lateral member and the second lateral member being positioned perpendicular with the bumper member and the cover member.

3. The grouser-cage attachment for equipment as claimed in claim 1 comprising:
a hydraulic motor;
a plurality of weights;
the hydraulic motor comprising a stator and a rotor;
the stator being mounted onto the first lateral member, opposite to the roller;
the rotor being torsionally connected to the main shaft;
the plurality of weights being positioned in between the first lateral member and the first circular base; and,
the plurality of weights being laterally connected about the main shaft.

4. The grouser cage skid steer attachment for equipment as claimed in claim 1 comprising:
the first lateral member tapering from the cover member to the bumper member;
the second lateral member tapering from the cover member to the bumper member; and,
a height of the cover member being greater than a height of the bumper member.

5. The grouser cage skid steer attachment for equipment as claimed in claim 1 comprising:
a coupler plate;
the coupler plate being positioned adjacent with the cover member, opposite the roller; and,
the coupler plate being fixed along the cover member.

6. The grouser cage skid steer attachment for equipment as claimed in claim 1 comprising:
a pair of first rollers;
the pair of first rollers being rotatably mounted into the first lateral member;
the pair of first rollers being positioned opposite with each other about the grouser cage; and,
the grouser cage being pressed against the pair of first rollers.

7. The grouser cage skid steer attachment for equipment as claimed in claim 1 comprising:
a pair of second rollers;
the pair of second rollers being rotatably mounted into the second lateral member;
the pair of second rollers being positioned opposite with each other about the grouser cage; and,
the grouser cage being pressed against the pair of second rollers.

8. The grouser cage skid steer attachment for equipment as claimed in claim 1, wherein a diameter of the grouser cage is three inches larger than a diameter of the roller.

9. A grouser-cage attachment for equipment comprising:
a main frame;
a roller;
a grouser cage;
a pair of first rollers;
a pair of second rollers;
the main frame comprising a bumper member, a cover member, a first lateral member, and a second lateral member;
the grouser cage comprising a cylindrical frame, a plurality of holes, and a plurality of cleats;
the first lateral member and the second lateral member being positioned parallel and offset from each other;
the bumper member and the cover member being positioned parallel and offset from each other;
the first lateral member and the second lateral member being fixed in between the bumper member and the cover member;
the roller being positioned in between the bumper member and the cover member;
a first circular base of the roller being rotatably mounted with the first lateral member;
a second circular base of the roller being rotatably mounted with the second lateral member;
the cylindrical frame being laterally positioned around the roller;
the plurality of holes and the plurality of cleats being distributed across the cylindrical frame;
the plurality of cleats being externally fixed with the cylindrical frame;

the plurality of holes being positioned offset amongst each other;

the plurality of cleats being positioned offset amongst each other;

each of the plurality of cleats being positioned parallel with a rotation axis of the roller;

the pair of first rollers being rotatably mounted into the first lateral member;

the pair of first rollers being positioned opposite with each other about the grouser cage;

the grouser cage being pressed against the pair of first rollers;

the pair of second rollers being rotatably mounted into the second lateral member;

the pair of second rollers being positioned opposite with each other about the grouser cage; and, the grouser cage being pressed against the pair of second rollers.

10. The grouser-cage attachment for equipment as claimed in claim 9 comprising:

the first lateral member and the second lateral member being positioned perpendicular with the bumper member and the cover member.

11. The grouser-cage attachment for equipment as claimed in claim 9 comprising:

a main shaft;
a first bearing;
a second bearing;
the main shaft being coaxially positioned with the roller;
the main shaft being rotatably mounted through the roller;
the main shaft being rotatably mounted to the first lateral member by the first bearing; and,
the main shaft being rotatably mounted to the second lateral member by the second bearing.

12. The grouser-cage attachment for equipment as claimed in claim 11 comprising:

a hydraulic motor;
a plurality of weights;
the hydraulic motor comprising a stator and a rotor;
the stator being mounted onto the first lateral member, opposite to the roller;
the rotor being torsionally connected to the main shaft;
the plurality of weights being positioned in between the first lateral member and the first circular base; and,
the plurality of weights being laterally connected about the main shaft.

13. The grouser cage skid steer attachment for equipment as claimed in claim 9 comprising:

the first lateral member tapering from the cover member to the bumper member;
the second lateral member tapering from the cover member to the bumper member; and,
a height of the cover member being greater than a height of the bumper member.

14. The grouser cage skid steer attachment for equipment as claimed in claim 9 comprising:

a coupler plate;
the coupler plate being positioned adjacent with the cover member, opposite the roller; and,
the coupler plate being fixed along the cover member.

15. The grouser cage skid steer attachment for equipment as claimed in claim 9, wherein a diameter of the grouser cage is three inches larger than a diameter of the roller.

* * * * *